Patented Aug. 15, 1933

1,922,464

UNITED STATES PATENT OFFICE 1,922,464

PROCESS FOR REMOVING EMULSOIDS FROM WATER SOLUTIONS

Oliver M. Urbain, Columbus, Ohio, assignor to Charles H. Lewis, Harpster, Ohio

No Drawing. Application May 11, 1931
Serial No. 536,698

2 Claims. (Cl. 210—2)

This invention contemplates the provision of a process for removing emulsoids from water solutions. In its more specific aspect, the invention contemplates treating a slightly acid solution to remove therefrom emulsoids which carry positive electric charges.

The term "emulsoid" as employed herein, is intended to designate a solvated colloid.

Emulsoids are exceedingly stable, and their stability is due to two important factors, namely: First, the surface film of water which envelops the emulsoid and is tenaciously adsorbed thereby and, second, the electrical charge carried by the emulsoid. When water solution is faintly acid, the emulsoids are positively charged. To destroy the stability of the emulsoids, it is necessary not only to eliminate the adsorbed water film, but also to neutralize the internal potential.

The present invention contemplates the introduction into a slightly acid solution containing emulsoids, molecules of definite chemical characterstics and configuration.

It is essential that the molecules introduced to the solution be not ionizable therein. It is also essential that the molecules have the capacity of being strongly adsorbed by the emulsoids. It is further essential that when the molecules introduced to the solution are adsorbed by the emulsoids, the exposed or outer portion thereof, after adsorption, be immiscible with water. It will thus be observed that molecules for use in the process must have a portion thereof which is strongly adsorbed and that the remaining portion must be immiscible with water. By the addition of small quantities of molecules possessing the above characteristics, the adsorbed water film carried on the emulsoids in the solution can be completely eliminated. This is effected by virtue of the adsorption by the emulsoids of the molecules which transform the emulsoids into suspensoids, and, due to the immiscibility with water of the unadsorbed portion of the molecules, the water film does not reform on the suspensoids. The suspensoids thus formed are susceptible to flocculation by the addition of minute quantities of suitable electrolytes to the solution.

Electrolytes adapted to effect flocculation of suspensoids formed in the manner above outlined should have a cation of low valence and an anion of high valence. $Na_3(PO_4)$; $K_3(PO_4)$; $Na_4Fe(CN)_6$ and $Na_3VO_4$ are exemplary of such electrolytes, the cation of each of which has a valence of 1 and the anion, a valence of 3 or 4.

Following the flocculation of suspensoids resulting from adsorption of molecules by the emulsoids, the resultant flocculated mass may be removed from the water solution by sedimentation, filtration or by coagulants capable of functioning at low pHs.

Since organic molecules are strongly adsorbed, the molecules which are introduced into the solution to be treated in accordance with the process should be preferably organic. The phenolic esters constitute a very satisfactory group of materials or reagents for incorporation in the solution. A common example of the phenolic esters is pentadigalloyl glucose. It occurs widely in nature and is easily synthesized. Furthermore, it is comparatively cheap and for this reason is desirable for utilization in the process. Other organic molecules of like character and suitable for use in the process are cholesterol glucosides.

In the carrying out of the process, the solution to be treated should be slightly acid; that is, it should have a pH from say pH 5.5 to pH 6.8. To the solution to be treated there is then added a solution of the phenolic ester which should be added to the solution undergoing treatment until the same has a milky appearance and a further addition of the treating agent produces no additional turbidity. The solution is then agitated and the electrolyte, for example, tri-sodium phosphate, is added. The pH of the solution should be kept below pH 7. The quantity of the reagents necessary to effect the desired removal of the emulsoids is so small, however, that no difficulty is ordinarily experienced with the pH range. The flucculated mass can be removed by filtration or coagulation by a suitable coagulant, for example, $Al_2(SO_4)_3$ or $Fe_2(SO_4)_3$.

The treating agents may be employed in amount depending upon the concentration of the emulsoids in the water solution. Ordinarily .20 grams of a phenolic ester or cholesterol glucoside per liter of a water solution, and .15 grams of the electrolyte per liter will be found to give excellent results.

After addition of the phenolic ester to the solution, the same should be agitated to effect thorough mixing for a period of one or two minutes; thereafter, the electrolyte may be added and the solution again agitated.

Having thus described my invention, what I claim is:—

1. A process for removing emulsoids from water solution, comprising adding to the water solution a phenolic ester, and an electrolyte which will dissociate to give a cation of low valence and an anion of high valence.

2. A process for removing emulsoids from water solutions, comprising adding to the water solution a phenolic ester, an electrolyte which will dissociate to give a cation of low valence and an anion of high valence and a coagulant.

OLIVER M. URBAIN.